Feb. 7, 1967     R. P. ALLEN ET AL     3,302,957

ANTI-JACK-KNIFING HITCH ASSEMBLY FOR TRACTOR-TRAILERS

Filed Feb. 5, 1965     2 Sheets-Sheet 1

INVENTORS
ROBERT P. ALLEN
WALTER D. CASHMAN
GENE W. SHORT
JACK O. WINSOR

BY    RONALD C. KAMP ATTY.

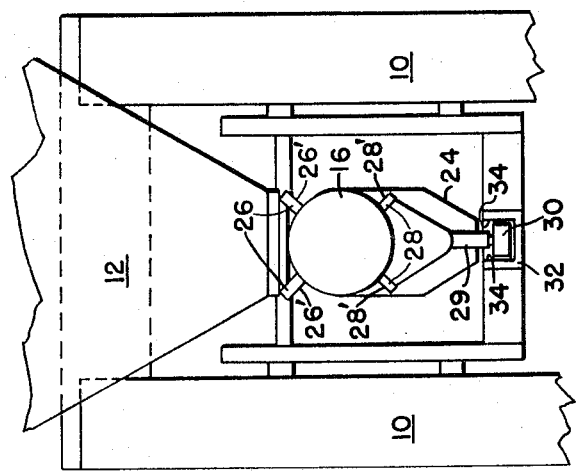
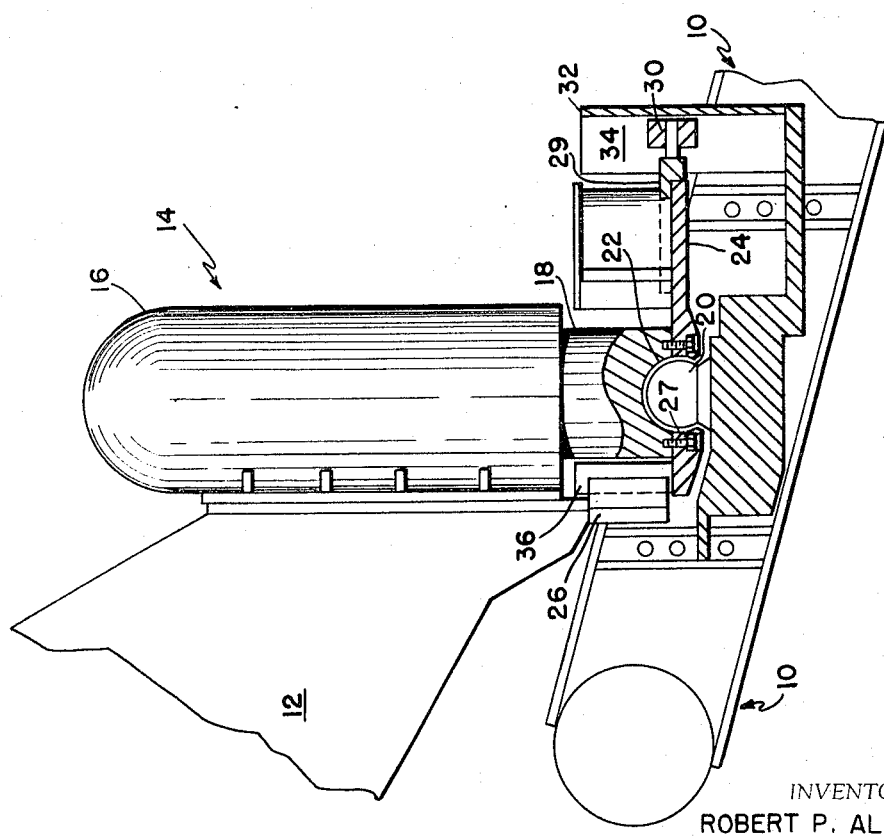

United States Patent Office 3,302,957
Patented Feb. 7, 1967

3,302,957
ANTI-JACK-KNIFING HITCH ASSEMBLY FOR TRACTOR-TRAILERS
Robert P. Allen, Walter D. Cashman, Gene W. Short, and Jack O. Winsor, all of Peoria, Ill., assignors to LeTourneau-Westinghouse Company, Peoria, Ill., a corporation of Illinois
Filed Feb. 5, 1965, Ser. No. 430,709
10 Claims. (Cl. 280—432)

The present invention relates to hitch assemblies in general, and more particularly, to hitch assemblies for connecting a prime mover and a trailing unit.

Various hitch assemblies for connecting a cargo-carrying trailer or trailing unit to a prime mover or tractor have been proposed in the past. Some of these, such as that shown in FIGS. 1 and 2 of Patent No. 3,014,739, for example, have provided means for limiting the angle through which the prime mover can turn from the straight-ahead position, but have utilized a cumbersome barbell structure with several bearing surfaces requiring lubrication. Such an arrangement is not only more expensive to manufacture, but also more difficult to maintain. Other hitch assemblies of the prior art did incorporate a single universal ball connector, but provided either no limit means, or a limit means which was inherently weak and short lived.

It is, therefore, an object of the present invention to provide a hitch assembly which has a limit means incorporated therein and which will be relatively easy and inexpensive to manufacture and maintain.

It is also an object of the present invention to provide a hitch assembly having a limit means which can be utilized in connection with a suspension unit wherein the limit means is operative even though the units coupled thereby move vertically relative to each other.

It is another object of this invention to provide a hitch assembly for use in connection with a suspension unit, and which has means incorporated therein to protect the suspension unit from being damaged by excessive vertical movement.

It is still another object of the present invention to provide a hitch assembly having limit means which are properly oriented even though the units coupled thereby may pitch and roll relative to each other, and, which is compact and capable of withstanding high loads.

These and other objects and many of the attendant advantages of the present invention will become more readily apparent from a perusal of the following specification and the accompanying drawings, wherein:

FIG. 3 is a side elevational view, partly in section, of the hitch assembly; and, FIG. 4 is a top plan view of the hitch assembly showing it in relation to the units coupled thereby.

Figure 1:
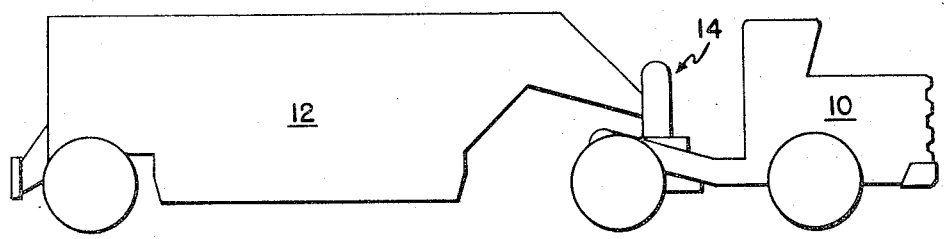
FIG. 1 is a side elevational view of a hitch assembly of this invention showing its relationship to a tractor and a trailing unit coupled thereby.
Figure 2:
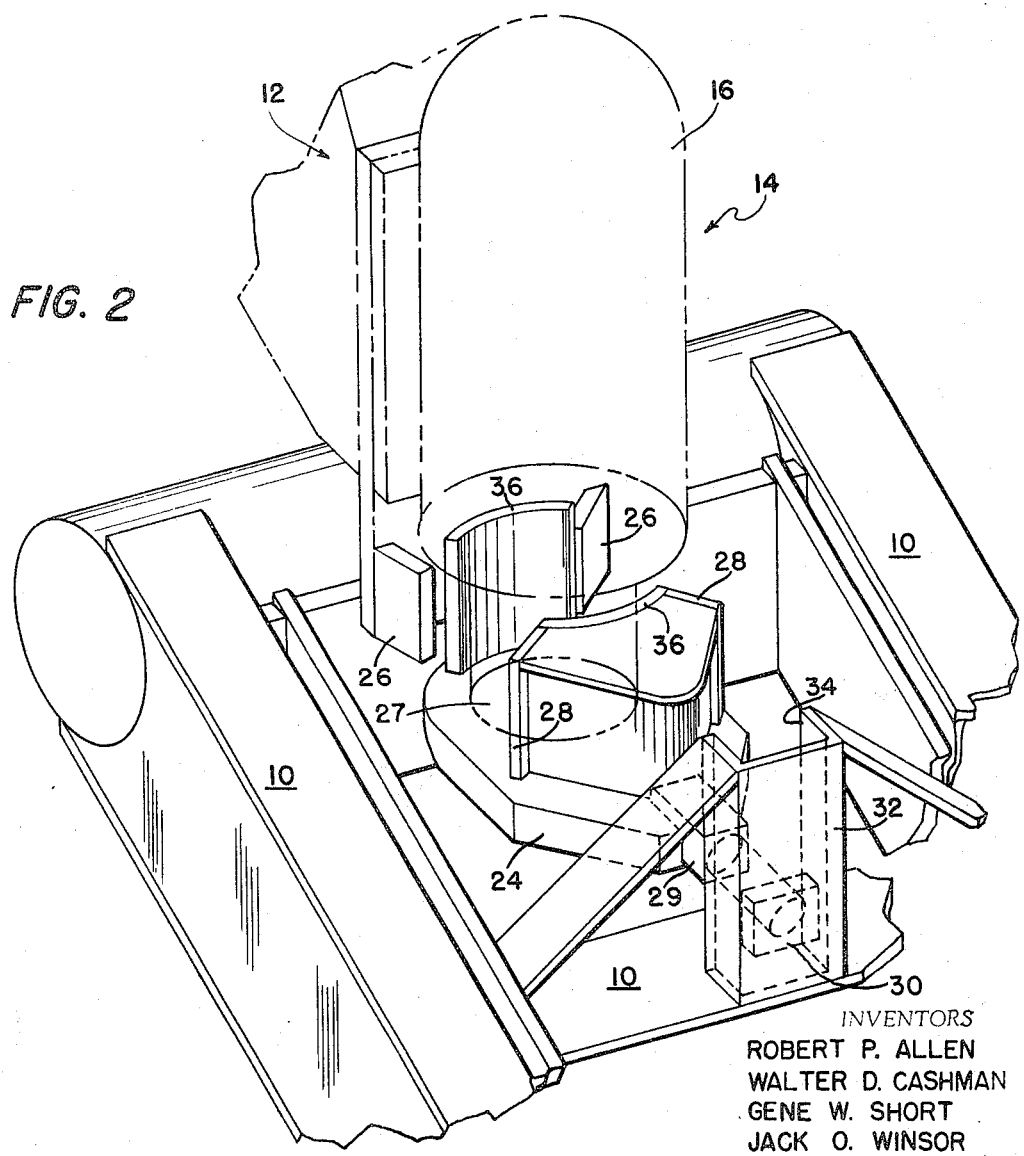
FIG. 2 is an isometric view, with parts broken away, showing the details of the hitch assembly and its limit means.

Referring now in detail to the drawings, there is shown in FIG. 1 a prime mover or tractor 10 and a trailing unit 12 which are coupled by a hitch assembly, indicated generally at 14. As best seen in FIG. 3, the cylinder portion 16 of a suspension unit, which may be of the type shown in FIG. 4 of Patent No. 3,014,739, is secured to the trailing unit 12. A piston, not shown, is reciprocably retained within the cylinder 16, and has a rod 18 secured thereon. The piston and rod 18 are rotatable about the longitudinal axis of the cylinder 16. It is to be understood that, if the characteristics of a suspension unit are not needed or desired, the cylinder and piston with its associated rod may be replaced by a simple king pin or rod rotatably mounted on the trailing unit 12. A universal ball connector 20 is secured to the tractor 10. A substantially hemispherical socket 22 is formed in the bottom surface of the rod 18 to accept the ball connector 20. A plate 24 having an opening 27 is secured to the rod 18. The opening 27 is slightly smaller than the diameter of the ball connector and serves to hold the rod on the connector, while permitting movement therebetween in all planes. A pair of stops or limit means 26 are attached to the trailing unit 12, one on each side of the cylinder 16. A pair of stops 28 are also secured to the plate 24. The stops 26 and 28 are secured at an angle to the longitudinal axis of the vehicle and present flat outer surfaces or faces 26' and 28', the planes of which pass through the center of the ball connector 20. Since all the stops are positioned approximately an equal distance from the center of the connector 20, the stops will meet in face to face engagement, i.e., there will be no line or point contact. This is necessary to insure that the stops will be wear resistant and free from failure due to high stress loading. When a suspension unit, as illustrated, is utilized the relative elevations of the stops 26 and 28 will vary with the pay load imposed on the trailing unit and with the shock loads imposed by encountering a rough and uneven surface during transit. Thus, the stops 26 are of sufficient vertical length and positioned on the trailer 12 so that the largest possible area will be presented for engagement with the stops 28 when the maximum payload is being carried by the trailer. Under these conditions the suspension unit will be heavily loaded, and the greatest loads are possible of application to the stops in a sharp turn, hence the need for a large area to maintain low stresses. An extension bar or strut 29 is secured to the plate 24 and extends outwardly therefrom. A slider block 30 is rotatably mounted on the free end of the strut 29, the axis of rotation passing through the center of the ball connector 20. A guide means 32 is attached to the tractor 10 and comprises a pair of parallel and normally vertical walls 34 spaced apart approximately the width of the block 30. The slider block is positioned between the walls 34 so that the block can move vertically relative to the guide means in an arc about an axis transverse to the tractor through the center of the ball connector, but can not move relative to the guide means about the longitudinal axis of the rod 18.

A pair of bottom check or stop means 36 are secured to the upper surface of the plate 24 on diametrically opposite sides of the rod 18. These checks are positioned on the plate under the cylinder 16, and extended upward to a height sufficient to require the checks to contact the cylinder before the piston does, i.e., before the suspension unit bottoms out. The checks, therefore, function to limit the amount of collapse of the suspension unit and thereby prevent the unit from being damaged by excessive vertical impact loads.

*Operation*

The universal ball connector 20, being rigidly secured to the tractor 10 and held by the plate 24 to the rod 18, forms a strong physical connection between the tractor and the trailer for transmitting the tractive effort or pulling force from the former to the latter. The ball connector also would permit the tractor and trailer to oscillate in all planes relative to each other. However, the plate 24 is attached to the rod and is not rotatable about a vertical axis relative to the tractor because the slider block 30 is retained within the guide means 32 on the tractor 10. Thus, the pivoting of one unit relative to the other unit occasioned by steering the tractor will be accomplished by the rotation of the rod 18 within the cylinder 16, which is secured to the trailer. The stops 28 on the plate 24, which stops are effectively attached to the tractor, will pivot along with both the rod 18 and plate 24 about the axis of the cylinder as the vehicle executes a turn. When the degree of turn approaches that which would constitute an unsafe operating condition, the stops 28 will have engaged the stops 26 on the trailer. Thereafter, no further turning, i.e., articulation of one unit relative to the other, can be effected.

Because the vehicle will be operated over a surface which is not smooth and level, the tractor must be capable of pitching and rolling relative to the trailer; during such movement, the limiting means must be as effective as if the surface were smooth and level. Such a result is achieved by the plate, slider block and guide means arrangement. The stops 26 are rigidly fixed to the trailer and their orientation is determined. The engaging stops 28 are attached to the plate 24 which maintains a fixed relationship with the cylinder 16 and the rod 18. Thus, the two pairs of stops are always maintained in their original and proper orientation so that they meet in face to face engagement. The plate 24 is, however, restrained for rotation with the tractor 10 by means of the slider block 30 which is engaged by the guide means 32 on the tractor. The slider block is rotatably mounted on the plate about an axis through the center of the ball connector 20. This permits the tractor to pitch, as when an incline or decline in the road surface is encountered, and roll, i.e., rotate about a horizontal longitudinal axis, which rotation results when one side of the tractor is suddenly elevated or depressed.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A hitch assembly for connecting a tractor unit and a trailing unit comprising:
   rod means mounted on one of said units for rotation about a substantially vertical axis,
   a universal ball connector securing the rod means to the other of said units,
   a plate attached to the rod means,
   guide means mounted on said other unit,
   a slider block pivotally mounted on the plate and slidably retained in the guide means,
   and stop means mounted on each of said one unit and the plate for limiting the angular displacement between said units.

2. A hitch assembly for connecting a tractor unit and a trailing unit comprising:
   a universal ball connector mounted on one of said units,
   an expansible chamber suspension device having a cylinder, a piston and a piston rod mounted on the other of said units,
   a plate attached to said rod and securing said rod on said connector for universal movement,
   first stop means on said other unit,
   second stop means attached to the plate and engageable with the first stop means to limit the angular displacement between said units,
   a slider block pivotally attached to the plate, and
   guide means mounted on said one unit for permitting substantially vertical movement and prohibiting substantially horizontal movement of said block relative to the guide means.

3. A hitch assembly according to claim 2 and further comprising:
   check means mounted on the plate and engageable by the cylinder to prevent the piston from bottoming against the cylinder.

4. A hitch assembly according to claim 1 wherein:
   the pivotal mounting of the slider block on the plate provides a pivot axis which passes through the center of said ball connector.

5. A hitch assembly according to claim 4 wherein said vertical axis passes through the center of said ball connector.

6. A hitch assembly according to claim 1 wherein said guide means comprises a pair of flat substantially vertical walls spaced apart an amount equal to the width of said block.

7. A hitch assembly for connecting a tractor unit and a trailing unit comprising:
   a universal ball connector mounted on one of said units,
   an expansible chamber suspension device having a cylinder, a piston and a piston rod mounted on the other of said units,
   a plate attached to said rod and securing said rod on said connector for universal movement,
   first stop means on said other unit,
   second stop means attached to the plate and engageable with the first stop means to limit the angular displacement between said units, and
   means engaging the plate and said one unit to assure movement of the first stop means relative to the second stop means as the tractor unit changes the aforesaid angular displacement relative to the trailing unit.

8. A hitch assembly according to claim 7 and further comprising:
   check means mounted on the plate and engageable by the cylinder to prevent the piston from bottoming against the cylinder.

9. A hitch assembly for connecting a tractor unit and a trailing unit comprising:
   pivot means mounted on one of said units for rotation relative thereto about a substantially vertical axis,
   universal connector means securing the pivot means to the other of said units for pivotal movement about vertical, longitudinal and lateral pivot axes,
   a plate attached to the pivot means,
   first and second stop means mounted on each of said one unit and the plate, respectively, for limiting the angular displacement between said units, and
   means engaging the plate and said other unit permitting pivotal movement therebetween about said lateral and said longitudinal axes but assuring rotation of the first stop means relative to the second stop means about said vertical axis as the tractor unit changes the aforesaid angular displacement relative to the trailing unit.

10. A hitch assembly according to claim 9 wherein said universal connector means comprises a ball joint, and wherein said longitudinal pivot axis of pivotal movement between the plate and said other unit intersects the center of said ball joint.

References Cited by the Examiner

UNITED STATES PATENTS

| | | | |
|---|---|---|---|
| 1,853,701 | 4/1932 | Schlaegel | 280—438 |
| 2,146,145 | 2/1939 | Huffman | 280—432 |
| 2,360,823 | 10/1944 | Austin | 280—438 X |
| 3,014,739 | 12/1961 | Kress | 280—489 |

LEO FRIAGLIA, *Primary Examiner.*